(12) United States Patent
Seth et al.

(10) Patent No.: US 7,919,158 B2
(45) Date of Patent: Apr. 5, 2011

(54) INFRARED RADIATION REFLECTING INSULATED GLAZING UNIT

(75) Inventors: Jayshree Seth, Woodbury, MN (US); Raghunath Padiyath, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 597 days.

(21) Appl. No.: 11/755,932

(22) Filed: May 31, 2007

(65) Prior Publication Data

US 2009/0068384 A1 Mar. 12, 2009

Related U.S. Application Data

(63) Continuation-in-part of application No. 11/422,368, filed on Jun. 6, 2006, now abandoned.

(51) Int. Cl.
*E06B 3/00* (2006.01)
(52) U.S. Cl. .......... 428/34; 428/428; 428/432; 428/437; 428/480; 428/482; 428/699; 428/701; 428/702
(58) Field of Classification Search ................ 428/34, 428/428, 432, 437, 480, 482, 699, 701, 702
See application file for complete search history.

(56) References Cited

U.S. PATENT DOCUMENTS

| | | | |
|---|---|---|---|
| 2002/0136905 A1* | 9/2002 | Medwick et al. | 428/432 |
| 2003/0032681 A1* | 2/2003 | Coronado et al. | 516/98 |
| 2003/0134105 A1* | 7/2003 | Toshine et al. | 428/323 |
| 2003/0224182 A1* | 12/2003 | Simpson et al. | 428/437 |
| 2004/0004778 A1* | 1/2004 | Liu et al. | 359/883 |
| 2005/0074566 A1 | 4/2005 | Rouanet et al. | |
| 2005/0123772 A1 | 6/2005 | Coustet et al. | |
| 2006/0125158 A1 | 6/2006 | Rouanet et al. | |

FOREIGN PATENT DOCUMENTS

| | | |
|---|---|---|
| EP | 0947477 A1 | 10/1999 |
| EP | 0860406 B1 | 12/2001 |
| KR | 10-2006-0058712 A | 5/2006 |

* cited by examiner

*Primary Examiner* — Gwendolyn Blackwell
(74) *Attorney, Agent, or Firm* — Jeffrey M. Olofson

(57) ABSTRACT

An insulated glazing unit is described and includes a first transparent substrate spaced apart from a parallel second transparent substrate, a sealed void space defined between the first transparent substrate, second transparent substrate, and the window mounting member, and an infrared radiation reflecting multilayer polymeric film disposed between the first transparent substrate and the second transparent substrate. The infrared radiation reflecting multilayer polymeric film includes a plurality of alternating polymeric layers of a first polymer material and a second polymer material. At least one of the alternating polymer layers is birefringent and oriented. The alternating, polymeric layers cooperate to reflect infrared radiation.

23 Claims, 3 Drawing Sheets

INFRARED RADIATION REFLECTING INSULATED GLAZING UNIT

CROSS-REFERENCE TO RELATED APPLICATION

This application is a Continuation-in-Part of U.S. patent application Ser. No. 11/422,368, filed Jun. 6, 2006 now abandoned, entitled "INFRARED RADIATION REFLECTING INSULATED GLAZING UNIT", which is incorporated by reference herein in its entirety.

BACKGROUND

The present disclosure relates generally to insulated glazing unit having a polymeric infrared reflecting film disposed within the insulated glazing unit.

It is known that energy is controlled at a window by the reflection, transmission and absorption of solar radiation by the glazing type and emissivity of the glazing. An insulated glazing unit (IGU) contributes to the heat gain or loss of the window by three mechanisms: conduction of heat, convection whereby air currents within the IGU act as the transfer agent for heat, and radiation or re-radiation of the heat absorbed. When solar radiation strikes an IGU, energy is absorbed and either conducted or re-radiated. The ability to re-radiate is called emissivity. When a spectrally selective, vacuum deposited, metal or metallic coating is incorporated into the surface within an IGU, it assists with energy release by absorbing the infrared radiation portion of the solar spectrum and re-radiating the absorbed energy to the surrounding atmosphere in the direction of the surface of the coating and the atmosphere interface. However, these spectrally selective metal or metallic coatings have a variety of shortcomings.

SUMMARY

In one exemplary implementation, the present disclosure is directed to an insulated glazing unit. The insulated glazing unit includes a first transparent substrate spaced apart from a parallel second transparent substrate, a sealed void space defined between the first transparent substrate and the second transparent substrate, and an infrared radiation reflecting multilayer polymeric film disposed between the first transparent substrate and the second transparent substrate. The infrared radiation reflecting multilayer polymeric film includes a plurality of alternating polymeric layers of a first polymer material and a second polymer material. At least one of the alternating polymer layers is birefringent and oriented. The alternating polymeric layers cooperate to reflect infrared radiation.

These and other aspects of the subject invention will become readily apparent to those of ordinary skill in the art from the following detailed description together with the drawings.

BRIEF DESCRIPTION OF THE DRAWINGS

So that those having ordinary skill in the art to which the subject invention pertains will more readily understand how to make and use the subject invention, exemplary embodiments thereof will be described in detail below with reference to the drawings, in which.

DETAILED DESCRIPTION

Figure 1:
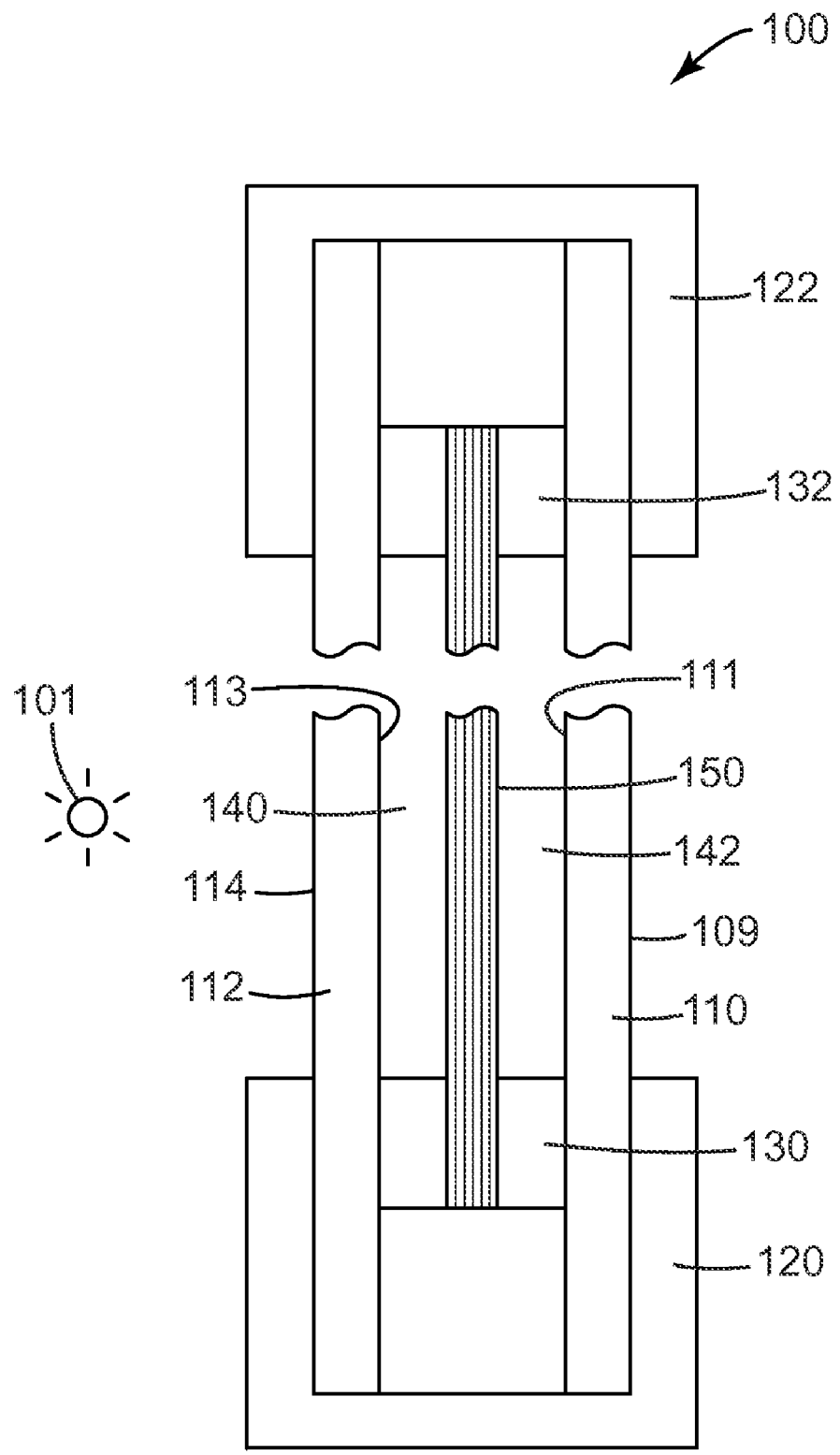
FIG. 1 provides an illustrative schematic cross-sectional view of an insulated glazing unit.

The present disclosure is directed to insulated glazing units, and particularly to insulated glazing units having polymeric infrared reflecting film disposed within the insulated glazing unit. While the present invention is not so limited, an appreciation of various aspects of the invention will be gained through a discussion of the examples provided below.

The following description should be read with reference to the drawings, in which like elements in different drawings are numbered in like fashion. The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized.

Unless otherwise indicated all numbers expressing feature sizes, amounts, and physical properties used in the specification and claims are to be understood as being modified in all instances by the term "about." Accordingly unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "polymer" will be understood to include polymers, copolymers (e.g., polymers formed using two or more different monomers), oligomers and combinations thereof, as well as polymers, oligomers, or copolymers that can be formed in a miscible blend.

The term "adjacent" refers to one element being in close proximity to another element and includes the elements touching one another and further includes the elements being separated by one or more layers disposed between the elements.

The present disclosure is applicable to insulated glazing units, and is more particularly applicable insulated glazing units having polymeric infrared reflecting film disposed within the insulated glazing unit. The insulated glazing units disclosed herein can be used for general glazing purposes. The insulated glazing units disclosed herein can provide high improved solar control at an acceptable cost and minimal complexity, for example.

One class of energy efficient windows are multi sheet-glazed insulating glass units ("IG units") having two or more spaced glass sheets which are becoming the industry standard for residential and commercial architecture in cool climates. An insulated glazing unit or insulating glass unit (commonly referred to as IGU) is described as two or more lites of glass (e.g., transparent substrates) spaced apart and hermetically sealed to form a single glazed unit with an void space between each lite. As the name suggests, the most important function of and IGU is to improve the thermal performance of glass when used in architectural applications. The most commonly found IGUs are double glazed, i.e. made with two lites of glass and are therefore also referred to as "double blazing units" or "DGU" (especially in Europe) but IGUs with three lites or more, i.e. "triple glazing" are sometimes used for in cold climates. Insulated glazing may be framed in a sash or frame or in a curtain wall. Insulated galzing units also include channel glass. An IG window unit can include at least first and second transparent substrates spaced apart from one another by at least one spacer and/or seal. The gap or space between the spaced apart substrates may or may not be filled with a gas (e.g., argon) and/or evacuated to a pressure less than atmospheric pressure in different instances.

The IG unit has improved thermal insulating performance over windows having single glass sheets due to its reduced conductive and convective transfer of heat compared to a conventional window. However, until fairly recently, the use of IG units has not been popular in geographic regions having warm to hot climates, e.g., those climates characterized by seasons requiring extensive periods of operating air conditioners, because the primary functionality required of windows in such regions is solar heat load reduction, not necessarily insulating value.

Solar-control coated glasses have been introduced. Such solar-control coated glasses achieve solar heat load reduction by decreasing the amount of solar energy (in the visible and/or near-infrared portions of the electromagnetic spectrum) that is directly transmitted through the coated glass, often by absorbing large amounts of the incident energy, irrespective of the wavelength, and/or by reflecting large amounts of visible light. Silver-based low emissivity (low-E) coatings have been recognized as also having a significant degree of solar-control functionality in addition to their insulating properties. Such silver-based solar-control/low-E coated glasses can have applicability not only in climates characterized by long heating seasons (for their low-E/thermal insulating performance) but also in climates characterized by long cooling seasons due to their solar-control benefits. The silver layer is often bounded by two dielectric layers and the layer thicknesses are optimized to minimize reflection in the visible part of the electromagnetic spectrum awhile maintaining high reflectivity in the infrared region.

The aforementioned low-E coatings are often applied on an interior surface of one of the two transparent substrates. Pyrolitically applied low-E coatings of materials such as tin oxide or doped tin oxide (e.g., fluorine doped tin oxide) often referred to as "hard coats", can improve the U-value of the windows. However, these often do not provide sufficiently low solar heat gain coefficient (SHGC), important in cooling load dominated regions. Improvement in the performance of IG Units is obtained by using magnetron sputtered layers of aforementioned materials such as silver or silver sandwiched between layers of NiCr. These sputtered coatings are often referred to as "soft coats". Furthermore, multiple silver stacks or silver bounded by a NiCr layer may be bounded by dielectric materials such as SiN, ITO, InO, designed to minimize reflectivity in the visible part of electromagnetic spectrum and are referred to as "spectrally selective low-E" coatings. While these coatings do lower SGHC and have low emissivity, they add significant complexity and cost to the resulting glass and windows.

IG units with low-E glass may enable infrared (IR) radiation to be blocked but they are typically lacking in terms of blocking UV radiation. Furthermore, typical solar control or low emissivity functional coatings act as a heat mirror during the tempering process, increasing the time required to temper the coated glass compared to that required to temper uncoated glass, further adding to the overall expense. Tempering processes are typically used to increase the strength of the glass. It is also known that the spectrally selective coatings consisting of multi-layers of vacuum deposited or sputter-deposited metals or metallic compounds can corrode sullen exposed to moisture or other chemicals.

Aftermarket solar control films are typically metallized foils applied onto the outer surfaces of the transparent substrates as a retrofit measure. These vacuum metal coated films provide solar performance at the cost of visible light transmission and sometimes have high visible light reflection. In the after-market application of these window films with corrosion prone silver metal, the exposed edges must be sealed with a water impermeable sealant to prevent the corrosion from starting and spreading. Even within an IG unit, measures need to be taken to prevent corrosion of the silver layers.

In view of the above, it can be seen that there exists a need for an energy efficient insulated glazing unit configuration that can provide high visible light transmission, higher UV blocking, low reflectivity, no corrosion, high solar heat rejection, and low U value all at an acceptable cost and minimal complexity, for example.

In many embodiments, a window or glazing unit including two spaced apart transparent substrates (glass, plastic, or the like) that are separated from one another by at least one seal and/or spacer, where a first one of the substrates supports a infrared radiation rejecting multilayer polymeric film on at least one surface and a low-E coating is optionally disposed on at least one of the transparent substrates.

In some embodiments, one transparent substrate has an infrared radiation rejecting multilayer polymeric film the second transparent substrate has a pyrolytically applied low-E coating. In additional embodiments one transparent substrate has an infrared radiation rejecting multilayer polymeric film and another the second transparent substrate has a single stack sputtered low-E coating. These embodiments can also be used in conjunction with a laminate wherein the infrared radiation rejecting multilayer polymeric film is sandwiched between layers of material such as PVB and then laminated to low-E class or between panes of glass (i.e., safety glass). Or the laminate is used as the first substrate in an insulating unit where the second substrate is a low-E glass.

In some embodiments, an insulated glazing unit includes a pair of transparent sheets of plastic or glass, spaced from each other in parallel alignment to present an internal space between them. At least one transparent substrate surface has a low-E coating on it and infrared radiation rejecting multilayer polymeric film is adhered to one of the transparent substrates or suspended within the internal space in parallel alignment with the transparent substrates.

Exemplary infrared radiation reflecting multilayer polymeric film includes a multilayer stack having alternating layers of at least two polymeric materials. The alternating layers have different refractive index characteristics so that some light (radiation) is reflected at interfaces between adjacent polymer layers. The alternating layers can be sufficiently thin so that light reflected at a plurality of interfaces undergoes constructive or destructive interference in order to give the film the desired reflective or transmissive properties. For multiplayer polymeric optical films designed to reflect light at visible and/or infrared wavelengths, each layer generally has an optical thickness (i.e., a physical thickness multiplied by refractive index) of less than about 1 micrometer. Thicker layers can, however, also be included, such as skin layers at the outer surfaces of the film, or protective boundary layers disposed within the film that separate packets of layers.

At least one of the polymer materials has the property of stress induced birefringence, such that the index of refraction (n) of the material is affected by the stretching process. The difference in refractive index at each boundary between layers will cause part of ray to be reflected. By stretching the multilayer stack over a range of uniaxial to biaxial orientation, a film is created with a range of reflectivities for differently oriented plane-polarized incident light. Multilayer optical films constructed accordingly exhibit a Brewster angle (the angle at which reflectance goes to zero for light incident at any of the layer interfaces) which is very large or is non-existent. As a result, these polymeric multilayer stacks having high reflectivity for both s and p polarized light over a wide bandwidth, and over a wide range of angles, reflection can be achieved.

The reflective and transmissive properties of infrared radiation reflecting multilayer polymeric film are a function of the refractive indices of the respective layers (i.e., microlayers). Each layer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. In practice, the refractive indices are controlled by judicious materials selection and processing conditions. Infrared radiation reflecting multilayer polymeric film can be made by co-extrusion of typically tens or hundreds of layers of two alternating polymers A, B, followed by optionally passing the multilayer extrudate through one or more multiplication dies, and then stretching or otherwise orienting the extrudate to form a final film. The resulting film is composed of typically tens or hundreds of individual layers whose thicknesses and refractive indices are tailored to provide one or more reflection bands in desired region(s) of the spectrum, such as in the visible, near infrared, and/or infrared. In order to achieve high reflectivities with a reasonable number of layers, adjacent layers preferably exhibit a difference in refractive index ($\Delta n_x$) for light polarized along the x-axis of at least 0.05. In some embodiments, if the high reflectivity is desired for two orthogonal polarizations, then the adjacent layers also exhibit a difference in refractive index ($\Delta n_y$) for light polarized along the y-axis of at least 0.05. In other embodiments, the refractive index difference $\Delta n_y$ can be less than 0.05 or 0 to produce a multilayer stack that reflects normally incident light of one polarization state and transmits normally incident light of an orthogonal polarization state.

If desired, the refractive index difference ($\Delta n_z$) between adjacent layers for light polarized along the z-axis can also be tailored to achieve desirable reflectivity properties for the p-polarization component of obliquely incident light. For ease of explanation, at any point of interest on a multilayer optical film the x-axis will be considered to be oriented within the plane of the film such that the magnitude of $\Delta n_x$ is a maximum. Hence, the magnitude of $\Delta n_y$ can be equal to or less than (but not greater than) the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$, i.e., $\Delta n_x \geq 0$.

To maintain high reflectivity of p-polarized light at oblique angles of incidence, the z-index mismatch $\Delta n_z$ between layers can be controlled to be substantially less than the maximum in-plane refractive index difference $\Delta n_x$, such that $\Delta n_z \leq 0.5 * \Delta n_x$. More preferably, $\Delta n_z \leq 0.25 * \Delta n_x$. A zero or near zero magnitude z-index mismatch yields interfaces between layers whose reflectivity for polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

Multilayer optical films have been described in, for example, U.S. Pat. No. 3,610,724 (Rogers); U.S. Pat. No. 3,711,1176 (Alfrey, Jr. et al.), "Highly Reflective Thermoplastic Optical Bodies For Infrared, Visible or Ultraviolet Light"; U.S. Pat. No. 4,446,305 (Rogers et al.); U.S. Pat. No. 4,540,623 (Im et al.); U.S. Pat. No. 5,448,404 (Schrenk et al.); U.S. Pat. No. 5,882,774 (Jonza et al.) "Optical Film"; U.S. Pat. No. 6,045,894 (Jonza et al.) "Clear to Colored Security Film"; U.S. Pat. No. 6,531,230 (Weber et al.) "Color Shifting Film"; PCT Publication WO 99/39274 (Ouderkirk et al.) "Infrared Interference Filter": and US Patent Publication 2001/0022982 A1 (Neavin et al.), "Apparatus For Making Multilayer Optical Films", all of which are incorporated herein by reference. In such polymeric multilayer optical films, polymer materials are used predominantly or exclusively in the makeup of the individual layers. Such films can be compatible with high volume manufacturing processes, and may be made in large sheets and roll goods.

The multilayer film can be formed by any useful combination of alternating polymer type layers. In many embodiments, at least one of the alternating polymer layers is birefringent and oriented. In some embodiments, one of the alternating polymer layer is birefringent and orientated and the other alternating polymer layer is isotropic. In one embodiment, the multilayer optical film is formed by alternating layers of a first polymer type including polyethylene terephthalate (PET) or copolymer of polyethylene terephthalate (coPET) and a second polymer type including poly(methyl methacrylate) (PMMA) or a copolymer of poly(methyl methacrylate) (coPMMA). In another embodiment, the multilayer optical film is formed by alternating layers of a first polymer type including polyethylene terephthalate and a second polymer type including a copolymer of poly)(methyl methacrylate and ethyl acrylate). In another embodiment, the multilayer optical film is formed by alternating layers of a first polymer type including a glycolated polyethylene terephthalate (PETG—a copolymer ethylene terephthalate and a second glycol moiety such as, for example, cyclohexanedimethanol) or a copolymer of a glycolated polyethylene terephthalate (coPETG) and second polymer type including polyethylene naphthalate (PEN) or a copolymer of polyethylene naphthalate (coPEN). In another embodiment, the multilayer optical film is formed by alternating layers of a first polymer type including polyethylene naphthalate or a copolymer of polyethylene naphthalate and a second polymer type including poly(methyl methacrylate) or a copolymer of poly (methyl methacrylate). Useful combination of alternating polymer type layers are disclosed in U.S. Pat. No. 6,352,761 and U.S. Pat. No. 6,797,396, which are incorporated by reference herein.

An infrared radiation absorbing pigment layer can include a plurality of metal oxide nanoparticles. A partial listing of metal oxide nanoparticles includes tin, antimony, indium and zinc oxides and doped oxides. In some embodiments, the metal oxide nanoparticles include, tin oxide, antimony oxide, indium oxide, indium doped tin oxide, antimony doped indium tin oxide, antinomy tin oxide, antimony doped tin oxide or mixtures thereof. In some embodiments, the metal oxide nanoparticles include tin oxide or doped tin oxide and optionally further includes antimony oxide and/or indium oxide. The nanoparticles can have any useful size such as, for example, 1 to 100, or 30 to 100, or 30 to 75 nanometers. In some embodiments, the metal oxide nanoparticles include antimony tin oxide or doped antimony tin oxide dispersed in a polymeric material. The polymeric material can be any useful binder material such as, for example, polyolefin, polyacrylate, polyester, polycarbonate, fluoropolymer, and the like.

An infrared radiation reflecting pigment layer can include metal oxide. These infrared light reflection pigments can have any color, as desired. Useful infrared light reflection pigments are described in U.S. Pat. No. 6,174,360 and U.S. Pat. No. 6,454,848, and are incorporated by reference herein to the extent they do not conflict with the present disclosure. Metallic layers such as silver, can also function to provide an infrared radiation reflecting layer.

FIG. 1 provides an illustrative but non-limiting schematic cross-sectional view of an insulated glazing unit 100. An infrared radiation source 101 (such as the sun) is shown directing radiation into the insulated glazing unit 100. The insulated glazing unit 100 includes a first transparent substrate 110 spaced apart (with a spacer element 130, 132) from a parallel second transparent substrate 112. The first transparent substrate 110 and the second transparent substrate 112 can be formed of any useful transparent material. In many embodiments, the first transparent substrate 110 and the second transparent substrate 112 are formed of glass or a polymeric material such as, for example, a polyolefin, polycarbonate, polyimide, polyester, and the like. The first transparent substrate 110 includes an internal surface 111 and a parallel opposing external surface 109. The second transparent substrate 112 includes an internal surface 113 and a parallel opposing external surface 114.

In some embodiments a low emissivity or "low-E" coating (as described above) disposed on the first transparent substrate 110 and/or the second transparent substrate 112. The low-E coating can be applied to the internal surfaces 113, 111 and/or external surfaces 114, 109 of the first transparent substrate 110 and/or the second transparent substrate 112.

A window mounting member 120, 122 may, optionally, be disposed about a perimeter of the first transparent substrate 110 and the second transparent substrate 112. A sealed void space 140, 142 is defined between the first transparent substrate 110 and the second transparent substrate 112 and the window mounting member 120, 122. The window mounting member can be formed of any useful material such as, for example, wood, metal and/or polymer. In many embodiments, the sealed void space 140, 142 is under vacuum or filled with air, argon gas, xenon gas, or krypton gas, as desired. In some embodiments, the window mounting member 120, 122 are frame elements.

An infrared radiation reflecting multilayer polymeric film 150 is disposed between the first transparent substrate 110 and the second transparent substrate 112. The infrared radiation reflecting multilayer polymeric film 150 is suspended between the first transparent substrate 110 and the second transparent substrate 112. In many embodiments, the infrared radiation reflecting multilayer polymeric film 150 is spaced apart from the first transparent substrate 110 and the second transparent substrate 112; and a first sealed void space 140 is defined by the second transparent substrate 112 internal surface 113, a spacer member 130, 132 or window mounting member 122, 120, and the infrared radiation reflecting multilayer polymeric film 150; and a second sealed void space 142 is defined by the first transparent substrate 110 internal surface 111, a spacer member 130, 132 or window mounting member 120, 122, and the infrared radiation reflecting multilayer polymeric film 150.

The infrared radiation reflecting multilayer polymeric film 150 includes a plurality of alternating polymeric layers of a first polymer material and a second polymer material and at least one of the alternating polymer layers is birefringent and oriented and the alternating polymeric layers cooperate to reflect infrared radiation. The infrared radiation reflecting multilayer polymeric film 150 is further described above.

In many embodiments, the first polymer material includes polyethylene terephthalate or a copolymer of polyethylene terephthalate and the second polymer material includes poly (methyl methacrylate) or a copolymer of poly(methyl methacrylate). In further embodiments, the first polymer material includes cyclohexanedimethanol or a copolymer of cyclohexanedimethanol and the second polymer material includes polyethylene naphthalate or a copolymer of polyethylene naphthalate.

In some embodiments, an infrared radiation reflecting pigment (as described above) layer can be disposed adjacent to the infrared radiation reflecting multilayer polymeric film. In some embodiments, an infrared radiation absorbing pigment (as described above) layer can be disposed adjacent to the infrared radiation reflecting multilayer polymeric film. In other embodiments, an infrared radiation reflecting pigment layer and an infrared radiation absorbing pigment layer can be disposed adjacent to the infrared radiation reflecting multilayer polymeric film. In further embodiments, an infrared radiation reflecting metal layer (as described above) can be disposed adjacent to the infrared radiation reflecting multilayer polymeric film.

Figure 2:
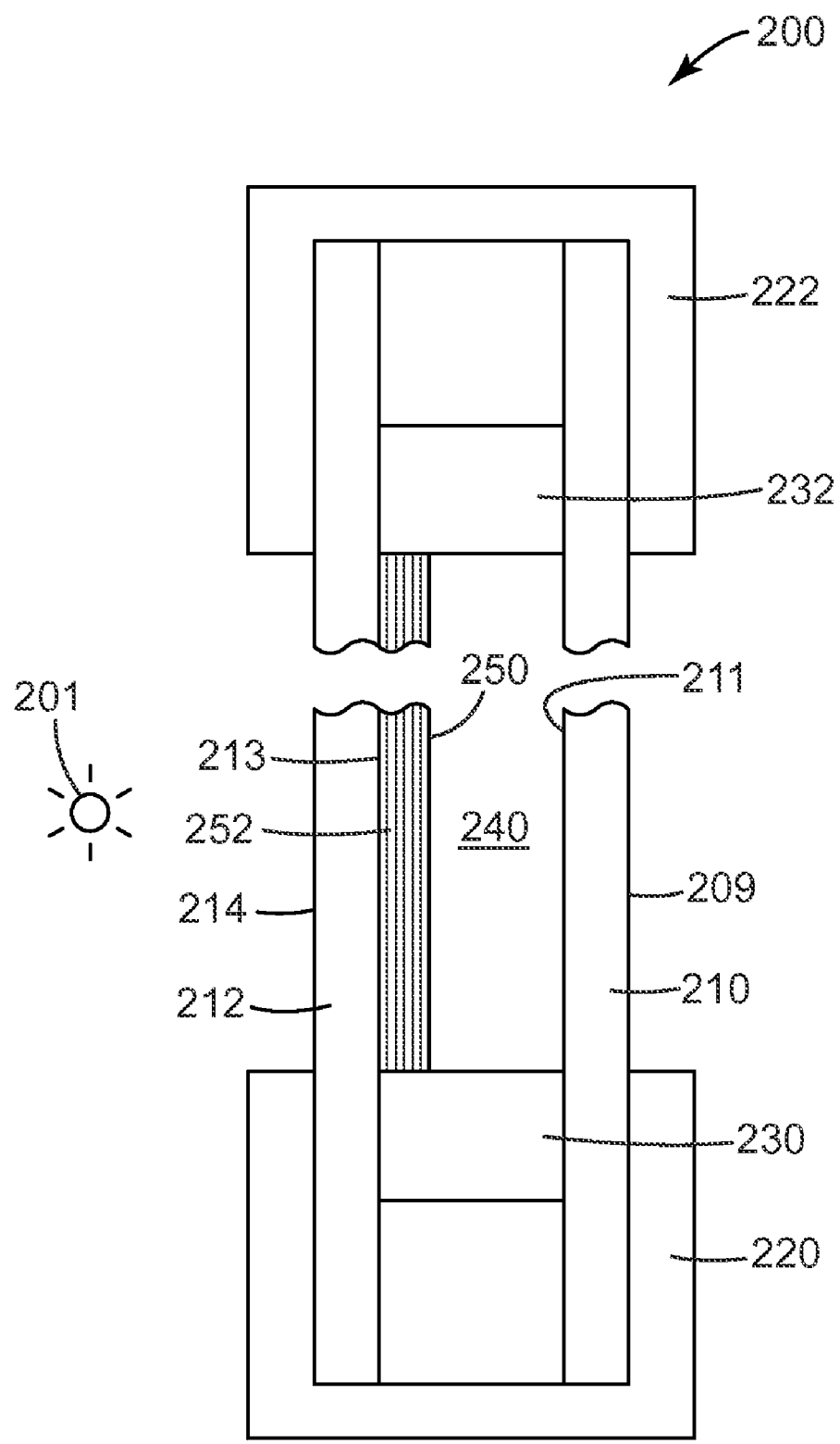
FIG. 2 is an illustrative schematic cross-sectional view of another insulated glazing unit.

FIG. 2 is an illustrative schematic cross-sectional view of another insulated glazing unit 200. An infrared radiation source 201 (such as the sun) is shown directing radiation into the insulated glazing unit 200. The insulated glazing unit 200 includes a first transparent substrate 210 spaced apart (with a spacer element 230, 232) from a parallel second transparent substrate 212. The first transparent substrate 210 and the second transparent substrate 212 can be formed of any useful transparent material. In many embodiments, the first transparent substrate 210 and the second transparent substrate 212 are formed of glass or a polymeric material such as, for example, a polyolefin, polycarbonate, polyimide, polyester, and the like. The first transparent substrate 210 includes an internal surface 211 and a parallel opposing external surface 209. The second transparent substrate 212 includes an internal surface 213 and a parallel opposing external surface 214.

In some embodiments, a low emissivity or "low-E" coating (as described above) disposed on the first transparent substrate 210 and/or the second transparent substrate 212. The low-E coating can be applied to the internal surfaces 213, 211 and/or external surfaces 214, 209 of the first transparent substrate 210 and/or the second transparent substrate 212.

A window mounting member 220, 222 may, optionally, be disposed about a perimeter of the first transparent substrate 210 and the second transparent substrate 212. A sealed void space 240 is defined between the first transparent substrate 210 and the second transparent substrate 212 and the window mounting member 220, 222. The window mounting member can be formed of any useful material such as, for example, wood, metal and/or polymer. In many embodiments, the sealed void space 240 is under vacuum or filled with air, argon gas, xenon gas, or krypton gas, as desired. In some embodiments, the window mounting member 220, 222 are frame elements.

An infrared radiation reflecting multilayer polymeric film 250 is disposed adjacent to the second transparent substrate 212, however the infrared radiation reflecting multilayer polymeric film 250 can be disposed adjacent to the first transparent substrate 210, as desired. In many embodiments, the infrared radiation reflecting multilayer polymeric film 250 is adhered to the first transparent substrate 210 or the second transparent substrate 212 with an adhesive layer 252 such as, for example, an optically clear adhesive. Some examples of adhesives that may be suitable for adhesive layer 252 may include those described in U.S. Pat. No. 6,887,917 (Yang et al.), the entire disclosure of which is herein incorporated by reference. The adhesive layer 252 may include a UV absorber. Some examples of UV absorbers may include a benzotriazole, such as TINUVIN 928 (CIBA Specialty Chemicals Corp; Tarrytown, N.J.), a triazine, such as TINUVIN 1577 (CIBA Specialty Chemicals Corp; Tarrytown, N.J.), a benzophenone, such as UVINUL 3039 (BASF; Ludwigshafen, Germany), a benzoxazinone, such as UV-3638 (Cytec; Charlotte, N.C.), and/or an oxalanilide. Alternatively a UV absorbing layer (including a UV absorber) may be disposed on or adjacent the infrared radiation reflecting multilayer polymeric film 250.

The sealed void space 240 is defined by the first transparent substrate 210 internal surface 211, a spacer member 230, 232 or window mounting member 220, 222, and the infrared radiation reflecting multilayer polymeric film 250. However, the sealed void space 240 can be defined by the second transparent substrate 212 internal surface 213, a spacer member 230, 232 or window mounting member 220, 222, and the infrared radiation reflecting multilayer polymeric film 250, if the infrared radiation reflecting multilayer polymeric film 250 is disposed adjacent to the first transparent substrate 210 (not shown).

The infrared radiation reflecting multilayer polymeric film 250 includes a plurality of alternating polymeric layers of a first polymer material and a second polymer material and at least one of the alternating polymer layers is birefringent and oriented and the alternating polymeric layers cooperate to reflect infrared radiation. The infrared radiation reflecting multilayer polymeric film 250 is further described above.

In many embodiments, the first polymer material includes polyethylene terephthalate or a copolymer of polyethylene terephthalate and the second polymer material includes poly(methyl methacrylate) or a copolymer of poly(methyl methacrylate). In further embodiments, the first polymer material includes cyclohexanedimethanol or a copolymer of cyclohexanedimethanol and the second polymer material includes polyethylene naphthalate or a copolymer of polyethylene naphthalate.

In some embodiments, an infrared radiation reflecting pigment (as described above) layer can be disposed adjacent to the infrared radiation reflecting multilayer polymeric film. In some embodiments an infrared radiation absorbing pigment (as described above) layer can be disposed adjacent to the infrared radiation reflecting multilayer polymeric film. In other embodiments, an infrared radiation reflecting pigment layer and an infrared radiation absorbing pigment layer can be disposed adjacent to the infrared radiation reflecting multilayer polymeric film. In further embodiments, an infrared radiation reflecting metal layer (as described above) can be disposed adjacent to the infrared radiation reflecting multilayer polymeric film.

Figure 3:
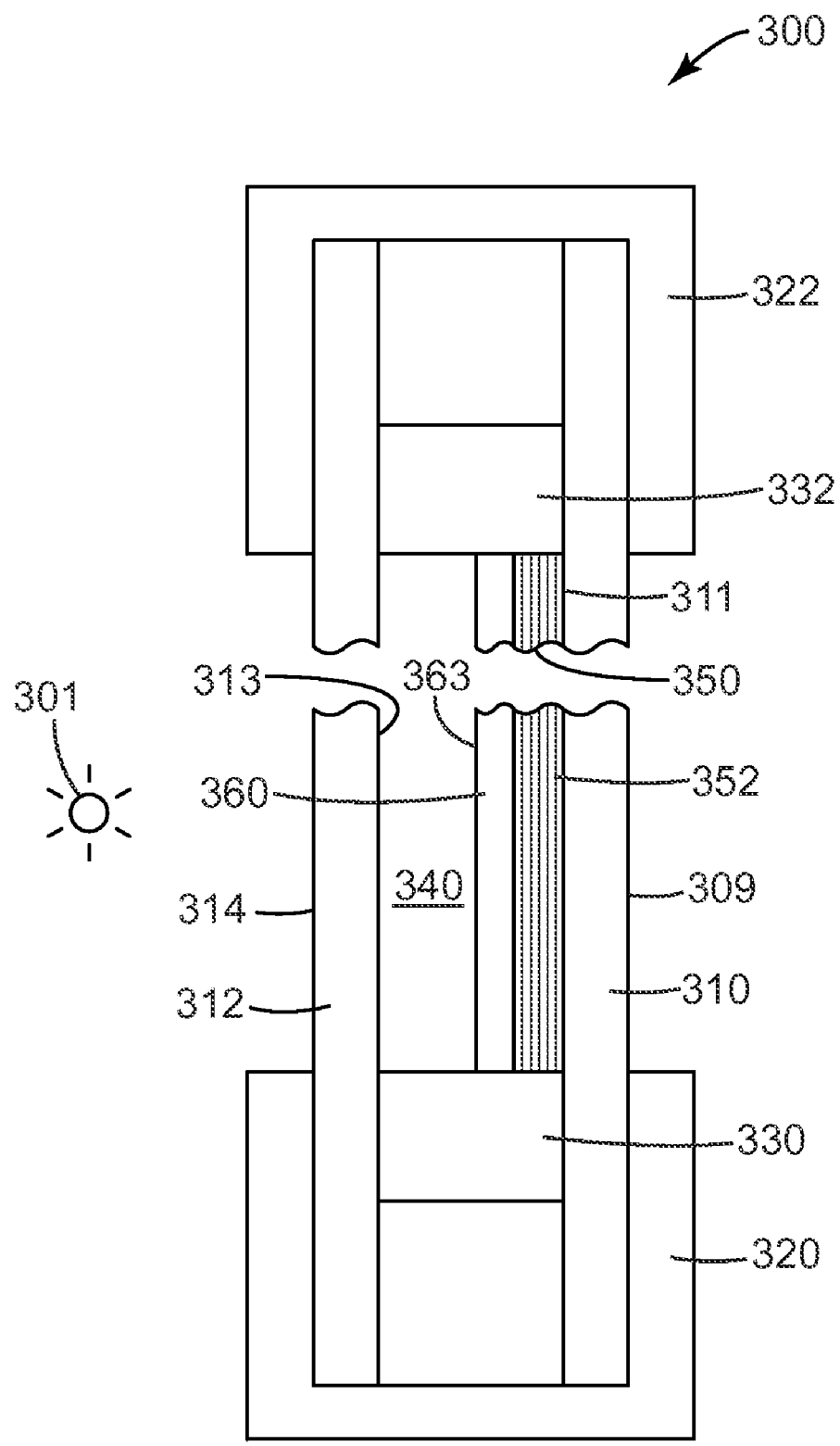
FIG. 3 is an illustrative schematic cross-sectional view of a further insulated glazing unit.

FIG. 3 is an illustrative schematic cross-sectional view of a further insulated glazing unit 300. An infrared radiation source 301 (such as the sun) is shown directing radiation into the insulated glazing unit 300. The insulated glazing unit 300 includes a first transparent substrate 310 spaced apart (with a spacer element 330, 332) from a parallel second transparent substrate 312. The first transparent substrate 310 and the second transparent substrate 312 can be formed of any useful transparent material. In many embodiments, the first transparent substrate 310 and the second transparent substrate 312 are formed of glass or a polymeric material such as, for example, a polyolefin, polycarbonate, polyimide, polyester, and the like. The first transparent substrate 310 includes an internal surface 311 and a parallel opposing external surface 309. The second transparent substrate 312 includes an internal surface 313 and a parallel opposing external surface 314.

In some embodiments, a low emissivity or "low-E" coating (as described above) disposed on the first transparent substrate 310 and/or the second transparent substrate 312 and/or a third transparent substrate 360 (described below). The low-E coating can be applied to the internal surfaces 313, 311 and/or external surfaces 314, 309 of the first transparent substrate 310 and/or the second transparent substrate 312 and/or to the internal surface 363 of the third transparent substrate 360.

A window mounting member 320, 322 may, optionally, be disposed about a perimeter of the first transparent substrate 310 and the second transparent substrate 312. A sealed void space 340 is defined between the first transparent substrate 310 and the second transparent substrate 312 and the window mounting member 320, 322. The window mounting member can be formed of any useful material such as, for example, wood, metal and/or polymer. In many embodiments, the sealed void space 340 is under vacuum or filled with air, argon gas, xenon gas, or krypton gas, as desired. In some embodiments, the window mounting member 320, 322 are frame elements.

The infrared radiation reflecting multilayer polymeric film 350 is adhered to the first transparent substrate 310 or the second transparent substrate 312 with an adhesive layer 352 such as, for example, an optically clear adhesive. The sealed void space 340 is defined by the second transparent substrate 312 internal surface 313, a spacer member 330, 332 or window mounting member 320, 322, and the infrared radiation reflecting multilayer polymeric film 350.

However, the scaled void space 340 can be defined by the first transparent substrate 310 internal surface 311, a spacer member 330, 332 or window mounting member 320, 322, and the infrared radiation reflecting multilayer polymeric film 350, if the infrared radiation reflecting multilayer polymeric film 350 is disposed adjacent to the second transparent substrate 312 (not shown).

A third transparent substrate 360 is disposed adjacent to the infrared radiation reflecting multilayer polymeric film 350 such that the infrared radiation reflecting multilayer polymeric film 350 is disposed between the third transparent substrate 360 and either the first transparent substrate 310 or the second transparent substrate 312. The third transparent substrate 360 can be formed of any useful material such as, for example, glass or polymeric material as described above. The third transparent substrate 360 can be formed of the same or different material than the material that forms the first transparent substrate 310 or the second transparent substrate 312.

The infrared radiation reflecting multilayer polymeric film 350 includes a plurality of alternating polymeric layers of a first polymer material and a second polymer material and at least one of the alternating polymer layers is birefringent and oriented and the alternating polymeric layers cooperate to reflect infrared radiation. The infrared radiation reflecting multilayer polymeric film 350 is further described above.

In many embodiments, the first polymer material includes polyethylene terephthalate or a copolymer of polyethylene terephthalate and the second polymer material includes poly (methyl methacrylate) or a copolymer of poly(methyl methacrylate). In further embodiments, the first polymer material includes cyclohexanedimethanol or a copolymer of cyclohexanedimethanol and the second polymer material includes polyethylene naphthalate or a copolymer of polyethylene naphthalate.

In some embodiments, an infrared radiation reflecting pigment (as described above) layer can be disposed adjacent to the infrared radiation reflecting multilayer polymeric film. In some embodiments, an infrared radiation absorbing pigment (as described above) layer can be disposed adjacent to the infrared radiation reflecting multilayer polymeric film. In other embodiments, an infrared radiation reflecting pigment layer and an infrared radiation absorbing pigment layer can be disposed adjacent to the infrared radiation reflecting multilayer polymeric film. In further embodiments, an infrared radiation reflecting metal layer (as described above) can be disposed adjacent to the infrared radiation reflecting multilayer polymeric film.

In some embodiments, a porous insulating material is provided between the first and second transparent substrates of the insulated glazing units described herein. The porous insulating material can have any useful thickness. In some embodiments, the porous insulating material has a thickness in a range from 3 millimeters or greater, up to the thickness of the void space between the first and second transparent substrates of the insulated glazing units described herein. The porous insulating material can be utilized in any form such as, for example, as a particulate, monolithic or fiber reinforced sheet, or sandwiched between transparent substrates. The porous insulating material can be separated from, in contact with, or attached to, the infrared radiation reflecting multilayer polymeric film (described above).

In many embodiments, the porous insulating material is porous silica having a void volume of 50% or greater, 60% or greater, 80% or greater, or 90% or greater, based on volume %. In many embodiments, the porous insulating material is light scattering. One useful configuration includes the infrared radiation reflecting multilayer polymeric film (described above) disposed between the first transparent substrate and the second transparent substrate and the porous insulating material positioned between the first transparent substrate and the second transparent substrate such that the infrared radiation reflecting multilayer polymeric film is between the porous insulating material and the solar source of infrared radiation (i.e., the sun).

In many embodiments, the porous insulating material is aerogel. In many embodiments, aerogel is a form of highly porous silica, described as a lattice work of glass strands with very small pores and low solids content (in some cases for example, 5% solid, 95% air or void volume). Silica aerogel call be made to absorb infrared radiation by incorporating opacifiers such as carbon black, titanium oxide, etc. In such embodiments, the infrared radiation reflecting multilayer polymeric film is positioned to reflect incident infrared radiation before any residual incident infrared radiation transmits to the aerogel.

Aerogel is known as a light weight and very good insulating solid. Aerogel is a low-density solid state material often derived from gel in which the liquid component of the gel has been replaced with gas. Aerogels are a class of open-celled mesoporous solid materials possessing no less than 50% porosity by volume. Often, aerogels are composed of 90-99.8% air, with densities ranging from 1.9 to around 150 mg/cm$^3$. At the nanoscale, an aerogel structurally resembles a sponge and is composed of a network of interconnected nanoparticles. The term aerogel does not refer to a particular substance itself but rather to a geometry a substance can take on—in fact, aerogels can be composed of a variety of materials including silica ($SiO_2$), alumina ($Al_2O_3$), transition and lanthanide metal oxides, metal chalcogenides (such as CdS and CdSe), organic and inorganic polymers, and carbon.

In many embodiments, the aerogel is hydrophobic. Hydrophobic aerogel particles can include organic aerogel particles, inorganic aerogel particles (e.g., metal oxide aerogel particles), or a mixture thereof. When the hydrophobic aerogel particles include organic aerogel particles, the organic aerogel particles can be selected from the group consisting of resorcinol-formaldehyde aerogel particles, melamine-formaldehyde aerogel particles, and combinations thereof. When the hydrophobic aerogel particles include inorganic aerogel particles, the inorganic aerogel particles can be metal oxide aerogel particles selected from the group consisting of silica aerogel particles, titania aerogel particles, alumina aerogel particles, and combinations thereof. In many embodiments, the hydrophobic aerogel particles are silica aerogel particles.

Any useful aerogel can be utilized with the present disclosure. For example, commercially available aerogel is available under the trade designation NANOGEL from Cabot Corporation.

Examples

The glazing performance characteristics of various types of insulated glazing units (IGUs) are shown in the Table below. The sun was modeled facing pane 1. Optics5 and Window5 modeling software available from windows and daylighting group at Lawrence Berkeley National Lab (http://windows.lbl.gov/software.default.htm) was used to model the window performance of the glazings shown in the Table below. All results reported are for center of glass calculations. Optical data published in International Glazing Database (IGDB) was used when available. Spectral measurement for films (when needed) were measured using Lambda 9 spectrophotometer and the spectral data imported into Optics5 and Window5 to perform the necessary calculations. Following substrates and films were used in the examples shown in the Table below.

PPG Clear Float Glass: 6 mm clear float glass available from PPG industries, PA (IGDB id number 5012). Cardinal float glass: 6 mm clear float glass available from Cardinal Glass, MN (IGDB ID number 2004)

PPG Sungate 500: 6 mm low-E coated glass available from PPG Industries. (IGDB ID number 5248)

CM 875: a 2 mil (nominal) Quarter wave IR reflecting film comprising 224 alternating layers of PET and coPMMA as described in U.S. Pat. No. 6,797,396 (for example, see Example 5).

PR70: Commercially available Prestige series after market 3M window film (70-0063-4912-3).

All Examples are IGU constructions filled with air. The glass substrates are placed 0.5" apart. Examples 6 and 7 are IGU constructions where the IR reflecting film is suspended between the glass panes a distance of 0.25 inch from each pane.

| Example | Film Configuration | Pane 1 Glass | Pane 1 External surface | Pane 1 Internal surface | Pane 2 Glass | Pane 2 Internal surface | Pane 2 External surface |
|---|---|---|---|---|---|---|---|
| 1 | adhered | PPG clear float glass | None | CM 875 Film | PPG Sungate 500 | Pyrolitic Low-E | None |
| 2 | adhered | PPG Sungate 500 | None | Pyrolitic Low-E | PPG clear float glass | CM 875 Film | None |
| 3 | adhered | PPG clear float glass | None | PR70 film | PPG clear float glass | None | None |
| 4 | adhered | PPG clear float glass | None | PR70 film | PPG Sungate 500 | Pyrolitic Low-E | None |
| 5 | adhered | PPG clear float glass | None | CM 875 film | Cardinal E178 | Sputtered single stack Low-E | None |
| 6 | suspended | Cardinal Float glass | None | | PPG Sungate 500 | Pyrolitic Low-E | None |
| 7 | suspended | PPG Sungate 500 | None | Pyrolitic Low-E | Cardinal Float glass | None | None |

The following table reports the calculated results as calculated according to the programs listed above.

| Example | Tvis (%) | SHGC | U value Winter | U value Summer | UV transmitted (%) |
|---|---|---|---|---|---|
| 1 | 70 | 0.52 | 0.35 | 0.35 | 0.1 |
| 2 | 70 | 0.53 | 0.35 | 0.35 | 0.1 |
| 3 | 62 | 0.40 | 0.46 | 0.49 | 0.1 |
| 4 | 58 | 0.36 | 0.35 | 0.35 | 0.1 |
| 5 | 72 | 0.48 | 0.31 | 0.30 | 5.0 |
| 6 | 66 | 0.49 | 0.32 | 0.35 | 8.0 |
| 7 | 66 | 0.46 | 0.33 | 0.35 | 8.0 |

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

We claim:

1. An insulated glazing unit comprising:
a first transparent substrate spaced apart from a parallel second transparent substrate;
a sealed void space defined between the first transparent substrate and the second transparent substrate; and
at least one infrared radiation reflecting multilayer polymeric film disposed between the first transparent substrate and the second transparent substrate; wherein the infrared radiation reflecting multilayer polymeric film comprises a plurality of alternating polymeric layers of a first polymer material and a second polymer material and at least one of the alternating polymer layers is birefringent and oriented and the alternating polymeric layers cooperate to reflect infrared radiation and the multilayer polymeric film has a thickness of at least 2 mils.

2. An insulated glazing unit according to claim 1 wherein the first transparent substrate and the second transparent substrate comprise glass.

3. An insulated glazing unit according to claim 1 wherein the sealed void space comprises air, argon gas, xenon gas, or krypton gas.

4. An insulated glazing unit according to claim 1 further comprising a low emissivity coating disposed on the first transparent substrate or the second transparent substrate.

5. An insulated glazing unit according to claim 1 wherein the first polymer material comprises polyethylene terephthalate or a copolymer of polyethylene terephthalate and the second polymer material comprises poly(methyl methacrylate) or a copolymer of poly(methyl methacrylate).

6. An insulated glazing unit according to claim 1 wherein the first polymer material comprises a glycolated polyethylene terephthalate or a copolymer of a glycolated polyethylene terephthalate and the second polymer material comprises polyethylene naphthalate or a copolymer of polyethylene naphthalate.

7. An insulated glazing unit according to claim 1 further comprising infrared radiation reflecting pigment layer disposed adjacent to the infrared radiation reflecting multilayer polymeric film.

8. An insulated glazing unit according to claim 1 further comprising an infrared radiation absorbing pigment layer disposed adjacent to the infrared radiation reflecting multilayer polymeric film.

9. An insulated glazing unit according to claim 1 further comprising an infrared radiation reflecting metal layer disposed adjacent to the infrared radiation reflecting multilayer polymeric film.

10. An insulated glazing unit according to claim 1 further comprising a fluorine doped tin oxide low emissivity coating disposed on the first transparent substrate or the second transparent substrate.

11. An insulated glazing unit according to claim 1 wherein the infrared radiation reflecting multilayer polymeric film is disposed adjacent to the first transparent substrate or the second transparent substrate.

12. An insulated glazing unit according to claim 1 wherein the infrared radiation reflecting multilayer polymeric film is adhered to the first transparent substrate or the second transparent substrate with an adhesive.

13. An insulated glazing unit according to claim 12 wherein the adhesive includes a UV absorber.

14. An insulated glazing unit according to claim 1 wherein the infrared radiation reflecting multilayer polymeric film is spaced away from the first transparent substrate and the second transparent substrate.

15. An insulated glazing unit according to claim 1 wherein the infrared radiation reflecting multilayer polymeric film is disposed adjacent to the first transparent substrate or the second transparent substrate and a third transparent substrate is disposed adjacent to the infrared radiation reflecting multilayer polymeric film.

16. An insulated glazing unit according to claim 15 wherein a low emissivity coating is disposed on the second transparent substrate or third transparent substrate.

17. An insulated glazing unit according to claim 16 wherein the low emissivity coating comprises a fluorine doped tin oxide.

18. An insulated glazing unit according to claim 16 wherein the low emissivity coating comprises a silver layer.

19. An insulated glazing unit according to claim 18 wherein a dielectric layer is disposed adjacent to the silver layer.

20. An insulated glazing unit according to claim 1 further comprising a porous insulating material having a thickness of 3 mm or greater and disposed between the first transparent substrate and the second transparent substrate.

21. An insulated glazing unit according to claim 20 wherein the porous insulating material comprises porous silica having a void volume of 50% or greater.

22. An insulated glazing unit according to claim 20 wherein the porous insulating material comprises aerogel.

23. An insulated glazing unit according to claim 20 wherein the porous insulating sol material comprises a hydrophobic silica aerogel.

* * * * *

UNITED STATES PATENT AND TRADEMARK OFFICE
CERTIFICATE OF CORRECTION

PATENT NO. : 7,919,158 B2
APPLICATION NO. : 11/755932
DATED : April 5, 2011
INVENTOR(S) : Jayshree Seth It is certified that error appears in the above-identified patent and that said Letters Patent is hereby corrected as shown below:

Title Page, item [57] Column 2, Abstract
Line 12, Delete "alternating," and insert in place thereof -- alternating --.

Column 2
Line 21, Delete "indicated" and insert in place thereof -- indicated, --.

Line 24, Delete "Accordingly" and insert in place thereof -- Accordingly, --.

Column 3
Line 5, Delete "blazing" and insert in place thereof -- glazing --.

Line 9, Delete "galzing" and insert in place thereof -- glazing --.

Line 43, Delete "awhile" and insert in place thereof -- while --.

Lines 46-47, Delete "Pyrolitically" and insert in place thereof -- Pyrolytically --.

Line 48, Delete "oxide)" and insert in place thereof -- oxide), --.

Column 4
Line 7, Delete "sullen" and insert in place thereof -- when --.

Line 43, Delete "class" and insert in place thereof -- glass --.

Column 6
Line 3, Delete "polarized" and insert in place thereof -- p-polarized --.

Line 12, Delete "3,711,1176" and insert in place thereof -- 3,711,176 --.

Signed and Sealed this
Nineteenth Day of June, 2012

David J. Kappos
*Director of the United States Patent and Trademark Office*

Column 6
Line 19, Delete "99/39274" and insert in place thereof -- 99/39224 --.

Line 20, Delete "Filter ":" and insert in place thereof -- Filter"; --.

Line 42, Delete "poly)(methyl" and insert in place thereof -- poly(methyl --.

Column 7
Line 36, Delete "embodiments" and insert in place thereof -- embodiments, --.

Line 44, Delete "scaled" and insert in place thereof -- sealed --.

Column 9
Line 20, Delete "Alternatively" and insert in place thereof -- Alternatively, --.

Line 54, Delete "embodiments" and insert in place thereof -- embodiments, --.

Column 10
Line 43, Delete "scaled" and insert in place thereof -- sealed --.

Column 11
Line 55, Delete "call" and insert in place thereof -- can --.

Column 12
Line 38, Delete "software.default" and insert in place thereof -- software/default --.

Column 13
Line 4, Delete "Pyrolitic" and insert in place thereof -- Pyrolytic --.

Column 13
Line 8, Delete "Pyrolitic" and insert in place thereof -- Pyrolytic --.

Line 16, Delete "Pyrolitic" and insert in place thereof -- Pyrolytic --.

Line 24, Delete "Pyrolitic" and insert in place thereof -- Pyrolytic --.

Line 27, Delete "Pyrolitic" and insert in place thereof -- Pyrolytic --.

Column 16
Line 19, In Claim 23, after "insulating" delete "sol".